Feb. 18, 1958 — R. HINTZE — 2,823,850
CARRIER FOR A MOTOR COMPRESSOR
OF A REFRIGERATING MACHINE

Filed Aug. 2, 1955 — 6 Sheets-Sheet 1

INVENTOR.
Rudolf Hintze
BY
Michael S. Striker
agt.

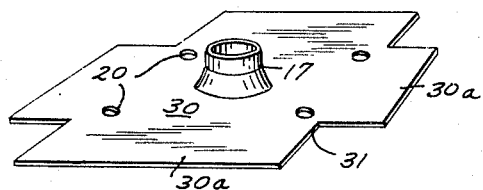
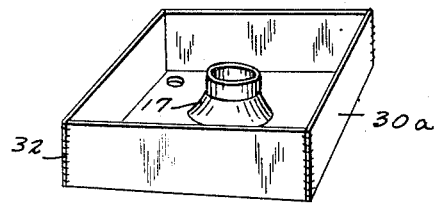
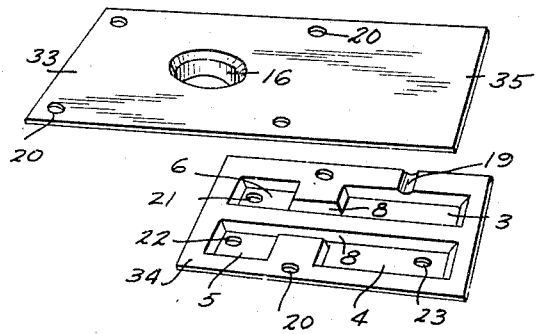
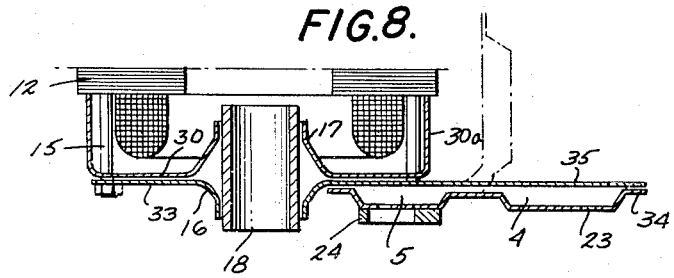

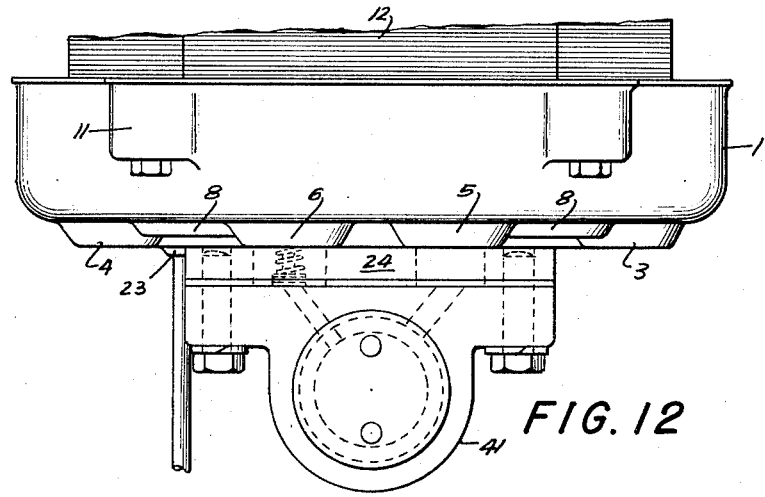
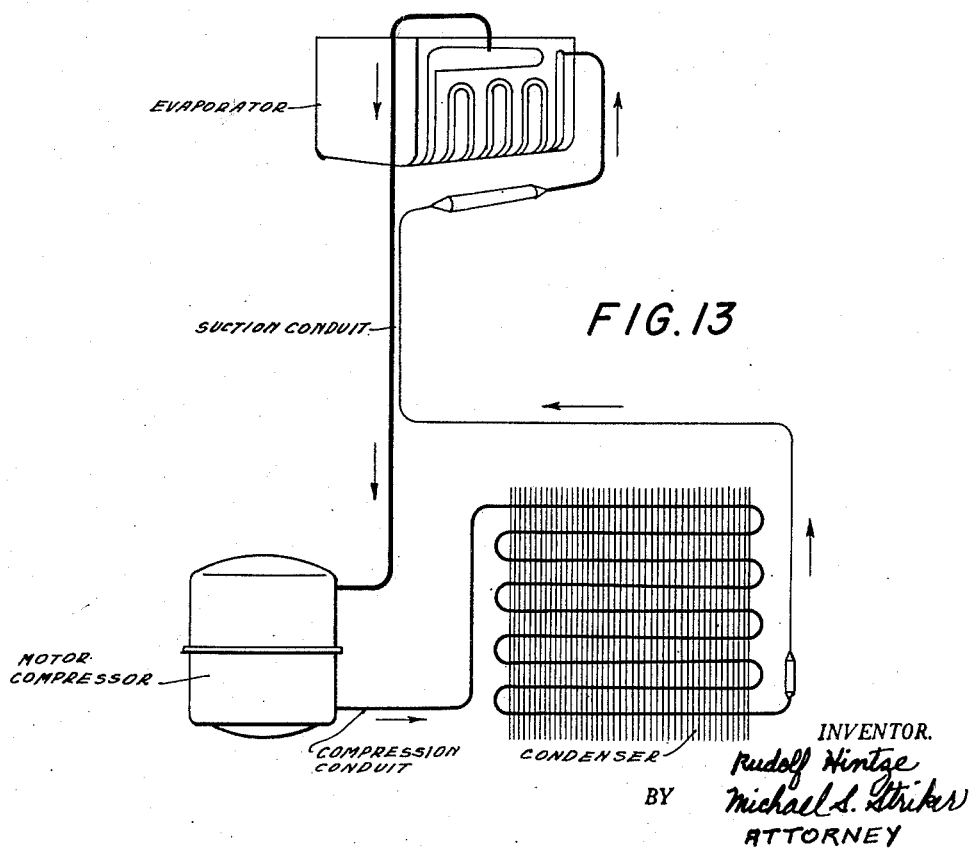

United States Patent Office 2,823,850
Patented Feb. 18, 1958

2,823,850

CARRIER FOR A MOTOR COMPRESSOR OF A REFRIGERATING MACHINE

Rudolf Hintze, Neuenhain uber Bad Soden am Taunus, Germany, assignor to Stempel-Hermetik G. m. b. H., Frankfurt, Germany Application August 2, 1955, Serial No. 525,929

Claims priority, application Germany August 5, 1954

12 Claims. (Cl. 230—58)

The present invention relates to refrigerating machines.

More particularly, the present invention relates to the motor compressor unit of a refrigerating machine and especially to the carrier which is connected to the motor and the compressor of such a refrigerating machine.

Such a carrier is conventionally made from a material such as cast iron which must be machined considerably after it is cast. Furthermore, such a carrier member must be perfectly clean before it is incorporated into the final assembly in order to guarantee proper operation, and the machining of a cast member creates great problems in cleaning the member after it is machined because chips, oil and the like, get into inaccessible places. In addition, a motor compressor unit of a refrigerating machine is required to be located in an extremely small space, and the minimum size required by a carrier in the form of a casting often creates difficulties with respect to the small space afforded for the motor compressor assembly. It is apparent, therefore, that in a conventional motor compressor assembly the provision of a conventional carrier which is a cast member machined subsequent to its casting creates many difficulties and undesirably increases the cost of the structure.

It is an object of the present invention to overcome the above drawbacks by providing for a motor compressor assembly of the above type a carrier which is not made from a cast member and which need not be machined. In this way, many of the above-mentioned problems resulting from the machining and the cleaning of a cast member are avoided.

It is a further object of the present invention to form a carrier of the above type out of sheet metal which may be stamped to a desired configuration and which may be formed with suitable openings and the like simultaneously with the stamping, so that the inconveniences produced by the above-mentioned machining are completely avoided.

Furthermore, it is an object of the present invention to provide in sheet metal members of the above type bulged portions which are capable of providing the carrier with chambers for reducing noise and for conveying the refrigerating fluid along a desired path between the compressor on the one hand and a condenser and evaporator on the other hand.

Still another object of the present invention is to provide a process for forming a carrier of the above type which eliminates many of the steps required in a conventional process for forming a carrier.

Furthermore, it is an object of the present invention to provide a structure capable of accomplishing all of the above objects and at the same time being composed of simple, rugged elements which are more reliable in operation, which are inexpensive and simple to manufacture, and which are very easily assembled together.

With the above objects in view, the present invention mainly consists of a carrier for the motor compressor of a hermetically sealed refrigerating machine, this carrier including at least two sheet metal members at least partly overlapping and joined fluid-tightly to each other and formed with openings and bulging portions serving as connecting surfaces, noise-reducing chambers, and a bearing carrier.

Also, with the above objects in view, the present invention mainly consists of a process for forming a carrier of the above type, this process comprising the steps of stamping into at least one of a pair of sheet metal plates a plurality of depressions and openings, and soldering these sheet metal plates together in an inert atmosphere to provide a fluid-tight connection between the plates.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a sectional, elevational view of a carrier constructed in accordance with the present invention and shown assembled together with a bearing sleeve and a fragmentarily illustrated stator of an electric motor, Fig. 1 being taken along line I—I of Fig. 3 in the direction of the arrows and the carrier of Fig. 1 being inverted with respect to Fig. 3 and being shown assembled with the bearing sleeve and stator which are omitted from Fig. 3;

Fig. 5 is a perspective view of one part of a carrier of another embodiment of the present invention before this part is formed into its final shape;

Fig. 6 is a perspective view of the part shown in Fig. 5 after it has been formed into its final shape;

Fig. 7 shows in a perspective, exploded view two additional parts which are assembled together with the part shown in Fig. 6;

Fig. 8 shows the elements of Figs. 6 and 7 in their assembled condition in a sectional, elevational view, and these parts are also shown joined to the stator of an electric motor and carrying a bearing sleeve for the crank shaft of the compressor;

Fig. 12 is a partial end view of Fig. 10 viewed in the direction of the arrow A in Fig. 10; and Fig. 13 is a schematic, overall view of the refrigerator unit, showing the pipe connections between the motor compressor, condensor and evaporator.

Figure 1:
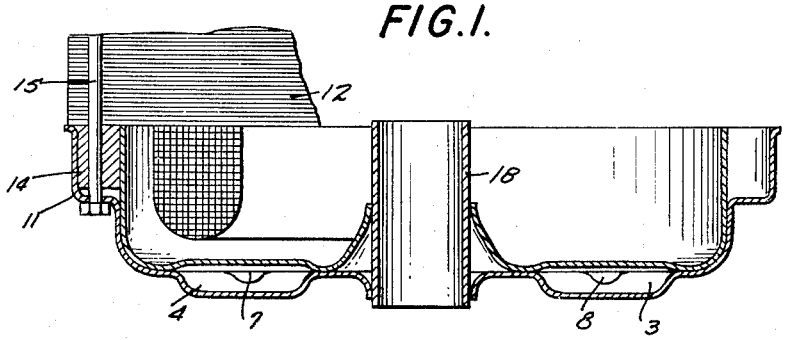
Figure 2:
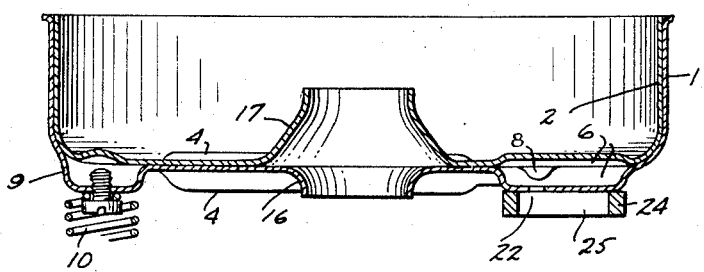
Fig. 2 is a sectional, elevational view taken along the line II—II of Fig. 3 in the direction of the arrows with the carrier of Fig. 3 shown in Fig. 2 in a position inverted with respect to the position of Fig. 3, the carrier being shown in Fig. 2 assembled with a spring and with a member for connecting the carrier with the compressor.
Figure 3:
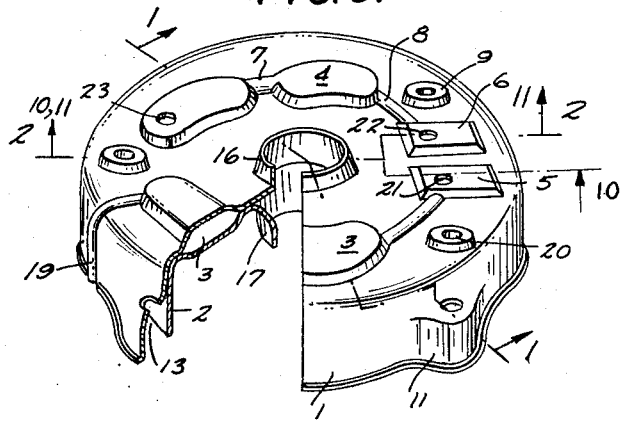
Fig. 3 is a perspective view of one embodiment of a carrier constructed in accordance with the present invention, part of the structure of Fig. 3 being broken away to illustrate the details of this structure.

Referring now to the Figs. 1–3, it will be seen that the carrier illustrated in these figures includes an outer dished member 1 and an inner dished member 2 nested within the outer dished member 1 and joined together in a fluid-tight manner preferably by soldering in an inert atmosphere so that the dished members 1 and 2 are unified into a single unit.

Figure 10:
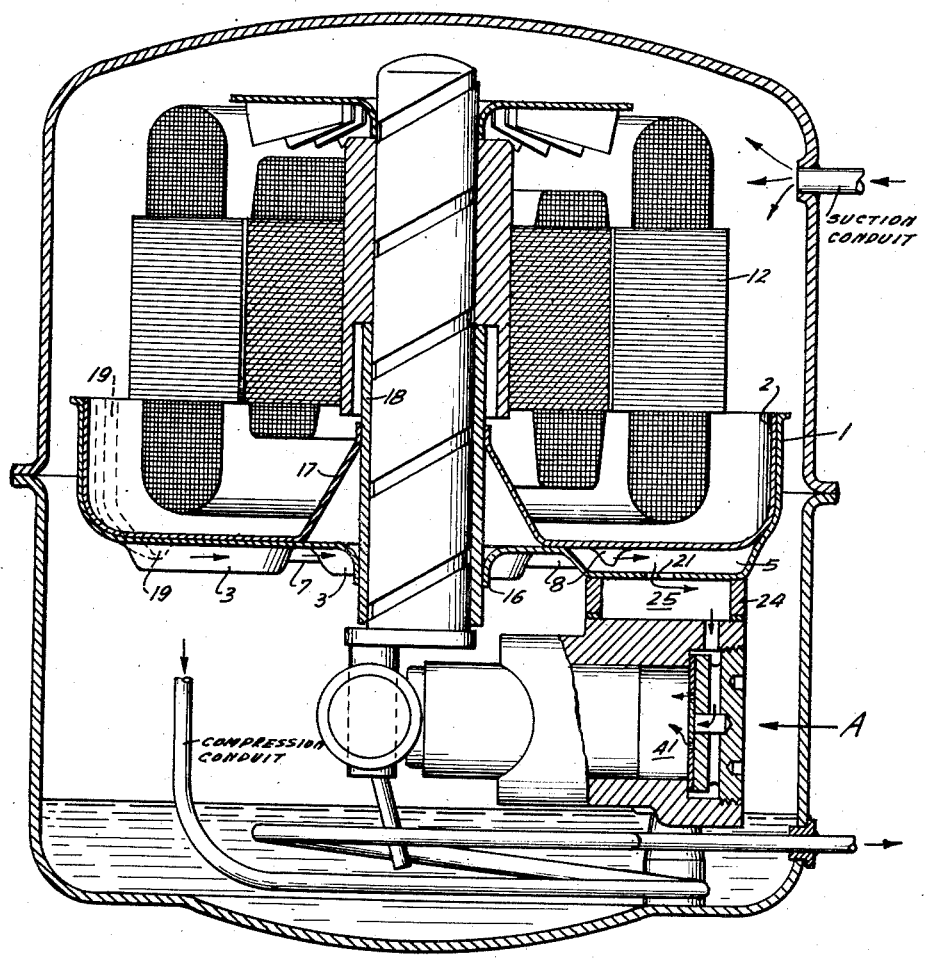
Fig. 10 is a sectional view of the motor compressor unit, the section being taken along line 10—10 of Fig. 3 in the direction of the arrows and showing a carrier as shown in Figs. 1–3.
Figure 11:
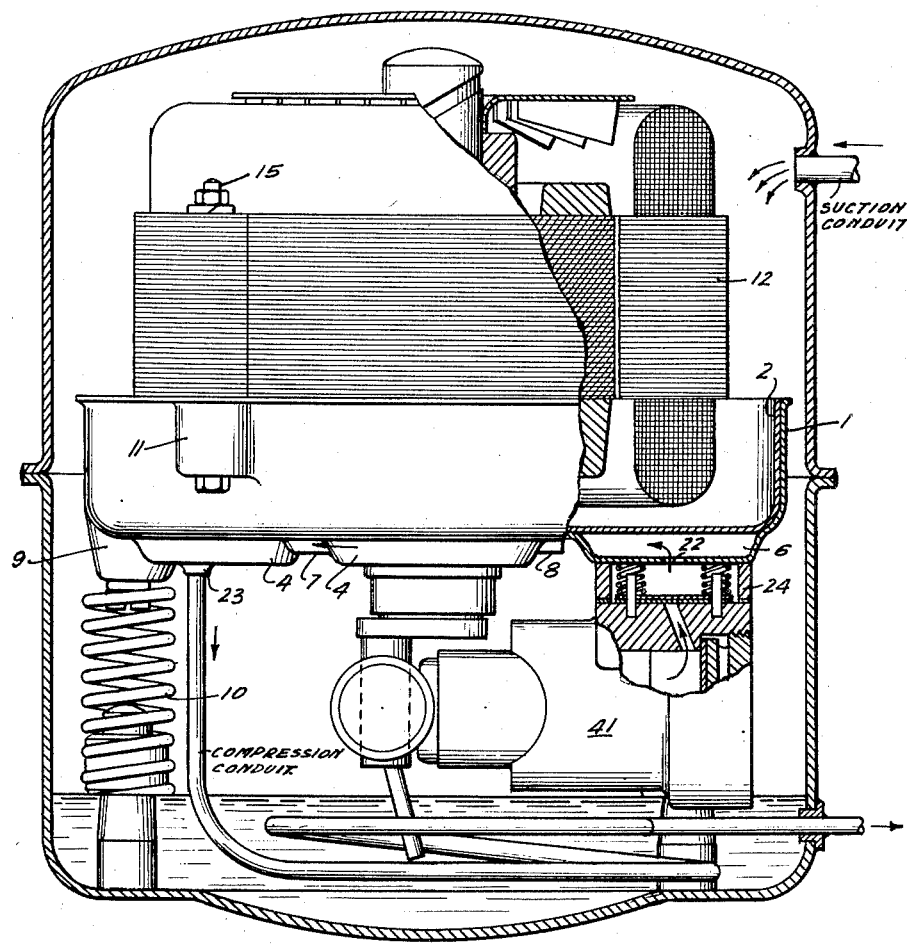
Fig. 11 is an elevational, partly sectioned view similar to Fig. 10, the section being taken along line 11—11 of Fig. 3.

In accordance with the present invention the dished members 1 and 2 are formed with bulged portions which define the noise-reducing chambers 3 and 4 when the dished members 1 and 2 are assembled in the manner illustrated in Figs. 1–3. Furthermore, the dished members 1 and 2 have bulged portions which together define antechambers 5 and 6 adapted to communicate with the compressor and respectively communicating with the chambers 3 and 4 through the conduit portions 7 and 8, respectively formed by elongated bulges in the outer dished member 1. These dished members are formed with additional bulged portions 9 which are adapted to be connected to springs 10 in the manner shown in Fig. 2, these springs resiliently supporting the motor compressor assembly, best shown in Figs. 10 and 11, and it will be noted that all of these bulged portions are symmetrically distributed in the floors of the dished members 1 and 2. The dished member 1 is furthermore formed with lateral, outwardly bulging portions 11 serving to fasten the dished members to the stator 12 of an electric motor. Preferably, bored blocks 14 are located within the spaces 13 formed between the bulged portions 11 of outer dished member 1 and the outer surface of inner dished member 2, and these blocks 14 are soldered to the dished members and serve to guide the connecting members 15 which serve to connect the carrier to the motor. Furthermore, the bottom wall portions of the dished members 1 and 2 are formed during stamping of these dished members, for example, with substantially frusto-conical extensions 16 and 17, respectively, which are centrally located with respect to the dished members and which extend away from each other in the manner indicated in Figs. 1–3. These tubular extensions 16 and 17 serve as a support for a bearing sleeve 18 (Fig. 1) which serves as a bearing for the crank shaft of the compressor, this crank shaft being driven by the motor 12 as shown in Figs. 10 and 11. This bearing sleeve 18 is welded firmly to the extensions 16 and 17 so that in addition to serving as a bearing, the sleeve 18 serves the additional function of adding stiffness to the assembly which forms the carrier of the present invention.

Where the carrier of the invention is to be used with a hermetically sealed motor compressor assembly of high output, such as for large refrigerators or refrigerated show cases, then, of course, the noise-reducing chambers 3 and 4 as well as the antechambers 5 and 6 must be fairly large. In order to be able to form chambers 3—6 of the required size in a practical manner, the bulged portions of the dished members 1 and 2 which define these chambers are mirror images of each other so that each member 1 and 2 is required to provide only a fraction of the volume of these chambers, and in this way it is possible to provide the desired large volume of these chambers without difficulty. On the other hand, the smaller conduit portions 7 and 8 as well as the suction conduit portion 19 leading to the chamber 3 are formed only in the dished member 1 by stamping the elongated bulged portions therein indicated in the drawings.

Openings 20—23 are preferably formed by stamping simultaneously with the stamping of the dished members or if these dished members are drawn then the openings 20—23 may be stamped immediately after the drawing in a combined drawing and stamping machine. The opening 23 serves as a connection for a looped pressure conduit which extends from the opening 23 through the casing wall of the refrigerating machine through the sealed cooling medium to the condenser, while the refrigerating medium flowing back from the evaporator of the refrigerating machine flows along the suction conduit 19 to the suction side of the compressor as diagrammatically shown in Fig. 13. In other words, the suction inlet of the compressor communicates with the opening 21 to draw fluid through conduit 19 into chambers 3 and from the latter through the conduit 8 into the antechamber 5 from where the fluid flows into the compressor to be forced by the compressor through the opening 21 connected to the pressure outlet of the compressor and then along the conduit 8 through the chambers 4 to the opening 23 from where the medium flows in the manner described above to the condenser.

In order to connect the compressor 4' to the carrier 1, 2 in a fluid-tight manner, a steel plate 24 (Figs. 2, 10, 11 and 12) is soldered to the outer surfaces of the antechambers 5 and 6 and the compressor is joined to this steel plate 24 with a suitable sealing element located therebetween. The plate 24 is provided with a pair of elongated cutouts 25 separated by a wall portion of the plate 24, and these cutouts 25 respectively communicate with the openings 21 and 22 and with the suction and pressure sides of the compressor so that in this way the compressor sucks fluid from chamber 5 and forces fluid into chamber 6.

Figure 4:
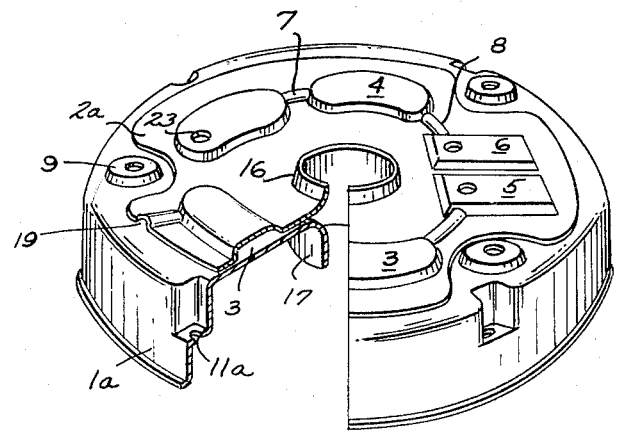
Fig. 4 is a perspective view of another embodiment of a carrier constructed in accordance with the present invention, part of the structure of Fig. 4 also being broken away to show more clearly the details of this structure.

The embodiment of the invention which is illustrated in Fig. 4 and which is suitable for motor compressor units of lighter weight and smaller output as compared to that associated with the embodiment of Figs. 1–3, differs from that of Figs. 1–3 in that the carrier of Fig. 4 includes only one dished member 1a. The other sheet metal member which cooperates with the dished sheet metal member 1a to form the carrier of Fig. 4 is simply in the form of a substantially disc-shaped plate 2a soldered to the outer surface of the bottom wall of the dished member 1a. With the embodiment of Fig. 4 only the sheet metal member 2a is formed with the bulged portions which provide the chambers 3—6 and the conduit means 7, 8 and 19 communicating with these chambers. However, the bulged portions 9 which serve as connections to the springs 10 and the bulged portions 11a which serve to connect the carrier to the motor are formed in the dished member 1a. Furthermore, the substantially frusto-conical tubular projections 16 and 17 are respectively formed in the members 2a and 1a and serve in the same way as in the embodiment of Figs. 1–3 to carry the bearing sleeve for the crank shaft of the compressor. With the embodiment of Fig. 4 the outer diameter of the single dished member 1a may be made relatively large inasmuch as the bulged portions 11a are formed by reentrant portions extending inwardly from the outer periphery of the dished member 1a, and with this embodiment, elements such as the blocks 14 shown in Fig. 1 are unnecessary and are omitted. Except for the above differences the embodiment of Fig. 4 is identical with that of Figs. 1–3 and cooperates in the same way with the motor and the compressor of the refrigerating machine.

Figs. 5–8 illustrate an embodiment of the invention which may advantageously be used with stators which do not have a cylindrical outer configuration, but which are, instead, more rectangular and provided with rounded corners, as they are sometimes formed in the newer refrigerating machines in order to save weight and space. Thus, with this embodiment of the invention, the carrier includes essentially a four-cornered box 32 open at its top as shown in Fig. 6 and formed by turning upwardly and joining to each other the flaps 30a formed in the plate 30 of Fig. 5 by forming angular cutouts 31 in the corners of this plate 30, and a substantially flat plate 33 joined to the outer surface of the bottom wall of the box 32 and extending at one side beyond the box 32.

The joining of the members 32 and 33 is preferably formed by spot or roll welding at suitable places. Furthermore, the upwardly bent flaps 30a which abut at their side edges are welded together at these abutting side edges. As is apparent from the drawings, the floor portion of the box 32 as well as the plate 35 are formed with the substantially frusto-conical tubular aligned extensions 17 and 16, respectively, which extend away from each other in the manner shown in the drawings and which serve to carry the bearing sleeve 18, as indicated in Fig. 8. Furthermore, both the plate 30 and the plate 35 are formed with openings 20, the openings 20 of plate 35 being aligned with the openings 20 of box 32 when these elements are joined to each other, and the connecting screws 15 of the stator extend through these openings when the motor is fixed to the carrier of Figs. 5–8.

The bulging portions which form the noise-reducing as well as fluid guiding chambers 3—6 as well as the conduits communicating with the same are formed in a separate plate 34 with the embodiment of Figs. 5–8, this plate 34 being joined directly to the underside of the plate 35 as by being soldered thereto in a fluid-tight manner. In the same way as was described above, the outer surfaces of the antechambers 5 and 6 have a plate 24 fixed thereto in order to properly connect the compressor with these antechambers. After the three parts 32–34 are joined together in the abovedescribed manner, the portion of parts 33 and 34 which extend beyond the box 32 in the manner shown at the right of Fig. 8 are bent upwardly to the dot-dash line position indicated in Fig. 8 so that the conduits 8 formed by elongated bulges in the plate 34 are curved, and it will be noted that in this dot-dash line position, which represents the final form of the structure, the portion 35 of plate 33 which extends beyond the box 32 as well as the portion of plate 34 joined to portion 35 are located closely adjacent to the box 32 so that the space required for the assembly is reduced in this way.

Figure 9:
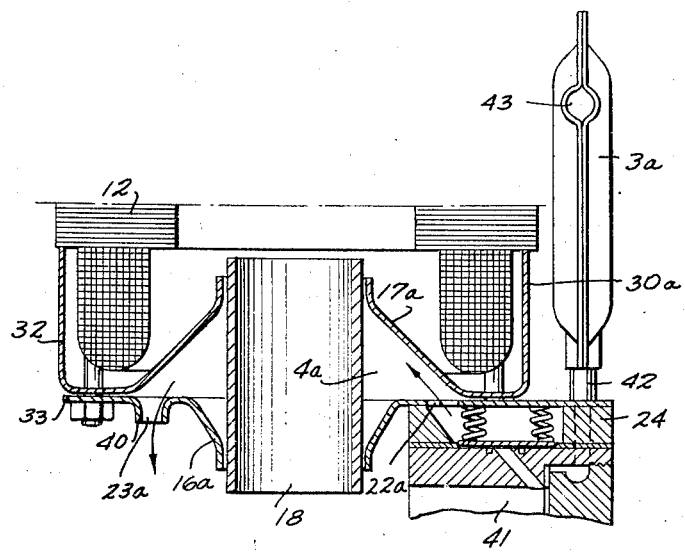
Fig. 9 shows in a sectional, elevational view still another embodiment of the present invention, Fig. 9 illustrating the manner in which the carrier of this figure is joined to the stator of an electric motor as well as to the compressor and to the bearing sleeve for the crank shaft of the compressor.

A further embodiment of the present invention is illustrated in Fig. 9 which is of advantage in that the distance through which the compressor extends downwardly from the carrier and radially toward the casing wall is less than would otherwise be the case, which is of considerable significance with respect to the effective size and material requirements of the casing, so that with this embodiment great advantage is derived from the saving of space required by the casing in the refrigerator. As is well known, only a minimum space is provided in a modern refrigerator to accommodate the refrigerating machine.

In contrast to the embodiment of Figs. 5–8, the embodiment of Fig. 9 is provided with relatively large frusto-conical tubular extensions 17a and 16a respectively formed in the sheet metal plates 32 and 33 which are joined to each other in a fluid-tight manner, as described above. These plates 32 and 33 which are, for example, soldered together, are fixed to the stator 12 in the manner shown in Fig. 9. Because of the relatively large aligned extensions 16a and 17a which extend away from each other, these extensions together with the bearing sleeve 18 carried by the same define a relatively large chamber 4a. Furthermore, the sheet metal member 33 is not spot welded to the dished sheet metal member 32. Instead, these members are soldered together in a fluid-tight manner and furthermore, an opening 22a is stamped in the member 33 and is located in a position diametrically opposed to the tubular extension 40 which is soldered to the plate 33 in alignment with another opening passing therethrough. Finally, the valve plate 24 of the compressor 41 fragmentarily illustrated in Fig. 9 is soldered in a fluid-tight manner to the plate 33 and extends as much as possible toward the lower tubular extension 16a.

In this manner, the distance through which the compressor 41 extends downwardly and laterally from the carrier 32, 33 of Fig. 9 is substantially shortened which is principally made possible by the fact that now the chamber 4a may be used as part of the path for the fluid under pressure as well as for noise-reducing purposes and, therefore, this space between the tubular extension and the bearing sleeve is no longer a dead space which serves no purpose. The suction noise-reducing chamber 3a is formed as a separate element with this embodiment of the invention and communicates through a tube 42 connected to chamber 3a with a suitable bore formed in the valve plate 24. The suction line communicates with the chamber 3a at the opening 43 thereof so that the sealed gas may flow in the direction shown in the arrows in Fig. 9 through the pressure noise-reducing chamber 4a to the outlet opening 23a of the tubular extension 42 to which the pressure line leading to the condenser is joined.

It will be understood that each of the elements described above, or two or more together, may also find a useful application in other types of refrigerating machines differing from the types described above.

While the invention has been illustrated and described as embodied in a carrier for refrigerating machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A carrier for the motor compressor of a hermetically sealed refrigerator machine comprising, in combination, two sheet metal members at least partly overlapping and joined fluid-tightly to each other, said sheet metal members respectively being formed with aligned tubular extensions extending away from each other; a bearing sleeve extending into and fixed to said tubular extensions and adapted to support a crank shaft for the compressor; and closed chamber means formed in part by at least one of said sheet metal members and adapted to be connected to the compressor and the condenser of the refrigerator machine for forming a noise-reducing chamber.

2. A carrier for use in a refrigerating machine comprising, in combination, a first sheet metal member adapted to be connected to the stator of a motor and a second sheet metal member overlapping and joined in a fluid-tight manner to said first sheet metal member, said second sheet metal member having an outwardly bulged portion forming with said first sheet metal member a noise-reducing chamber through which a fluid is adapted to pass and said first sheet metal member including a tubular portion formed integrally therewith for supporting a bearing for a crankshaft of a compressor.

3. A carrier, adapted to be connected to the motor and compressor of a refrigerating machine, comprising, in combination, inner and outer dished sheet metal members nested together and joined to each other in a fluid-tight manner, said outer member being formed with bulging portions bulging away from said inner member and the latter being formed with depressions bulging away from said bulging portions of said outer member and defining with the latter a plurality of chambers, said outer member being formed with grooves communicating with said chambers and with openings for connecting said chambers to a compressor and for connecting said sheet metal members to the stator of a motor.

4. A carrier, adapted to be connected to the motor and compressor of a refrigerating machine, comprising, in combination, inner and outer dished sheet metal members nested together and joined to each other in a fluid-tight manner, said outer member being formed with bulging portions bulging away from said inner member and the latter being formed with depressions bulging away from said bulging portions of said outer member and defining with the latter a plurality of chambers, said outer member being formed with grooves communicating with said chambers and with openings for connecting said chambers to a compressor and for connecting said sheet metal members to the stator of a motor, said inner and outer members being respectively formed with aligned integral tubular portions extending away from each other and serving to carry a bearing for a crankshaft.

5. A carrier, adapted to be connected to a motor and compressor of a refrigerating machine, comprising, in combination, a first box-shaped sheet metal member open at one side and having opposite said open side a wall portion formed with an integral tubular extension; a second sheet metal member fixed to and extending beyond said wall portion of said first member and having an integral tubular extension aligned with and extending away from said tubular extension of said box-shaped member; and a third sheet metal member formed with a plurality of depressions some of which communicate with each other, said third member being joined in a fluid-tight manner to said second member at the face thereof distant from said first member and said depressions forming with said second member suction and pressure noise-reducing chambers as well as chambers adapted to communicate respectively with the suction and pressure sides of a compressor.

6. A carrier, adapted to be connected to a motor and compressor of a refrigerating machine, comprising, in combination, a first box-shaped sheet metal member open at one side and having opposite said open side a wall portion formed with an integral tubular extension; a second sheet metal member fixed to and extending beyond said wall portion of said first member and having an integral tubular extension aligned with and extending away from said tubular extension of said box-shaped member; and a third sheet metal member formed with a plurality of depressions some of which communicate with each other, said third member being joined in a fluid-tight manner to said second member at the face thereof distant from said first member and said depressions forming with said second member suction and pressure noise-reducing chambers as well as chambers adapted to communicate respectively with the suction and pressure sides of a compressor, the portion of said second and third members which extend beyond said first member being curved away from the remainder of said second and third members and located adjacent said first member.

7. A carrier, adapted to be attached to the motor and compressor of a refrigerating machine, comprising a first dished sheet metal member formed with a frusto-conical tubular extension; a second sheet metal member joined in a fluid-tight manner to said first member and formed with a frusto-conical tubular extension aligned with and extending away from said extension of said first member, said second member being formed with a pair of openings communicating with the interior of said conical extension of said first member; a bearing sleeve fixed within said tubular extensions of said first and second members and defining with the latter a noise-reducing pressure chamber adapted to communicate through one of said openings with a compressor and through the other of said openings with a condenser.

8. In a refrigerating machine, in combination, a pair of sheet metal members superimposed on each other, said sheet metal members having respectively opposite contacting portions fixedly connected to each other and opposite portions respectively spaced from each other, said spaced portions forming respectively a pressure noise-reducing chamber adapted to be connected to a condenser, a pressure antechamber communicating with said pressure noise-reducing chamber and adapted to be connected to the pressure outlet of a compressor, a suction noise-reducing chamber adapted to communicate with an evaporator, a suction antechamber communicating with said suction noise-reducing chamber and adapted to communicate with the suction inlet of the compressor, all of said chambers and the communications therewith being formed only from said two sheet metal members.

9. In a refrigerating machine, in combination, a pair of sheet metal members superimposed on each other, said sheet metal members having respectively opposite contacting portions fixedly connected to each other and opposite portions respectively spaced from each other, said spaced portions forming respectively a pressure noise-reducing chamber adapted to be connected to a condenser, a pressure antechamber communicating with said pressure noise-reducing chamber and adapted to be connected to the pressure outlet of a compressor, a suction noise-reducing chamber adapted to communicate with an evaporator, a suction antechamber communicating with said suction noise-reducing chamber and adapted to communicate with the suction inlet of the compressor, all of said chambers and the communications therewith being formed only from said two sheet metal members; and a tubular projection integral with one of said members for carrying a bearing for the crankshaft of the compressor.

10. A carrier, adapted to be connected to the motor and compressor of a refrigerating machine, comprising, in combination, inner and outer dished sheet metal members nested together and joined to each other in a fluid-tight manner, said outer member being formed with bulging portions bulging away from said inner member and the latter being formed with depressions bulging away from said bulging portions of said outer member and defining with the latter a plurality of chambers, said outer member being formed with grooves communicating with said chambers and with openings for connecting said chambers to a compressor and for connecting said sheet metal members to the stator of a motor, and said outer member being formed with bulged portions for connecting said members to the stator of a motor.

11. A carrier, adapted to be connected to the motor and compressor of a refrigerating machine, comprising, in combination, inner and outer dished sheet metal members nested together and joined to each other in a fluid-tight manner, said outer member being formed with bulging portions bulging away from said inner member and the latter being formed with depressions bulging away from said bulging portions of said outer member and defining with the latter a plurality of chambers, said outer member being formed with grooves communicating with said chambers and with openings for connecting said chambers to a compressor and for connecting said sheet metal members to the stator of a motor, and said outer member being formed with bulged portions for connecting said members to the stator of a motor, said inner and outer members being formed with opposed bulged portions for connecting to said members springs for supporting the carrier.

12. A carrier, adapted to be connected to the motor and compressor of a refrigerating machine, comprising, in combination, a dished sheet metal member formed in a rim portion with reentrant portions for connecting the said dished member to a stator of a motor, said dished member also being formed in a wall portion thereof surrounded by said rim portion with bulged portions adapted to be connected to springs; and a second sheet metal member fixed in a fluid-tight manner to the outer surface of said wall portion of said dished member and formed with a plurality of depressions some of which communicate with each other and whose interior spaces are directed toward said outer surface of said wall portion of said first member to define with the latter suction and pressure chambers adapted to reduce noise and to provide communication between a compressor and an evaporator and condenser, respectively.

References Cited in the file of this patent

UNITED STATES PATENTS

| | | |
|---|---|---|
| 2,198,258 | Money | Apr. 23, 1940 |
| 2,454,569 | Rector | Nov. 23, 1948 |
| 2,497,668 | Grumblatt | Feb. 14, 1950 |
| 2,628,765 | Anderson | Feb. 17, 1953 |